United States Patent
Starr et al.

(10) Patent No.: US 7,336,770 B2
(45) Date of Patent: *Feb. 26, 2008

(54) METHOD AND APPARATUS FOR TELEPHONE LINE TESTING

(75) Inventors: Thomas J. J. Starr, Barrington, IL (US); Carlton Ligar Brown, San Antonio, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/297,626

(22) Filed: Dec. 7, 2005

(65) Prior Publication Data

US 2006/0088141 A1 Apr. 27, 2006

Related U.S. Application Data

(63) Continuation of application No. 10/200,669, filed on Jul. 22, 2002, now Pat. No. 7,003,078, which is a continuation-in-part of application No. 09/239,591, filed on Jan. 29, 1999, now abandoned.

(51) Int. Cl.
  *H04M 1/24* (2006.01)
  *H04M 3/08* (2006.01)
  *H04M 3/22* (2006.01)
(52) U.S. Cl. ............... 379/27.01; 379/1.04; 379/22.02
(58) Field of Classification Search ............ 379/27.01, 379/1.04, 22.02
  See application file for complete search history.

(56) References Cited

U.S. PATENT DOCUMENTS

| | | |
|---|---|---|
| 4,989,202 A | 1/1991 | Soto et al. |
| 5,128,619 A | 7/1992 | Bjork et al. |
| 5,461,318 A | 10/1995 | Borchert et al. |
| 5,672,974 A | 9/1997 | Turner |
| 5,715,277 A | 2/1998 | Goodson et al. |
| 5,778,050 A | 7/1998 | Park, II |
| 5,802,446 A | 9/1998 | Giorgi et al. |
| 6,002,671 A | 12/1999 | Kahkoska et al. |

(Continued)

FOREIGN PATENT DOCUMENTS

KR   1999-0066505   8/1999

OTHER PUBLICATIONS

Baker et al., "Telephone Access Network Measurements", 1998, Tektronix, pp. 1-74.*

*Primary Examiner*—Barry Taylor
(74) *Attorney, Agent, or Firm*—Toler Law Group, Intellectual Properties

(57) ABSTRACT

A method and apparatus for qualifying a telephone transmission line for XDSL communication services is disclosed. The system includes a modem, located at the customer premises to be connected. The modem analyzes actual signals to determine the electrical characteristics of the communication channel associated with the customer premises. The modem includes a transmitter, receiver and controller to generate test signals and receive responses. The modem then analyzes the data to generate an output value indicative of the electrical characteristics of the communication channel being tested. This output value is then displayed to a user or transmitted over the communication channel to a network. The system thereby eliminates the necessity of dispatching a technician to test the telephone line, and provides more accurate test results than those achievable at the network-side of the connection alone.

21 Claims, 3 Drawing Sheets

U.S. PATENT DOCUMENTS

| | | | |
|---|---|---|---|
| 6,014,425 A * | 1/2000 | Bingel et al. | 379/26.02 |
| 6,014,435 A | 1/2000 | Rosen | |
| 6,026,145 A * | 2/2000 | Bauer et al. | 379/22.03 |
| 6,263,047 B1 | 7/2001 | Randle et al. | |
| 6,292,468 B1 | 9/2001 | Sanderson | |
| 6,385,297 B2 | 5/2002 | Faulkner et al. | |
| 6,643,266 B1 * | 11/2003 | Pugaczewski | 370/249 |
| 6,891,803 B1 * | 5/2005 | Chang et al. | 370/252 |

* cited by examiner

METHOD AND APPARATUS FOR TELEPHONE LINE TESTING

CROSS-REFERENCE TO RELATED APPLICATION(S)

This application is a continuation of and claims priority from U.S. patent application Ser. No. 10/200,669, filed Jul. 22, 2002, now U.S. Pat. No. 7,003,078 and entitled "METHOD AND APPARATUS FOR TELEPHONE LINE TESTING," which is incorporated herein by reference in its entirety and which is a Continuation-in Part Application of U.S. patent application Ser. No. 09/239,591, filed on Jan. 29, 1999, now abandoned.

BACKGROUND

1. Field of the Disclosure

This invention relates generally to telephone line testing and more particularly to a method and apparatus for qualifying a customer node of a public switched telephone network for digital communications services.

2. Description of the Related Art

The characteristics of telephone lines vary greatly. Typical telephone lines connecting a customer premises to a public switch telephone network (PSTN) vary in terms of length, wire gauge, amount of bridged tap, background noise, loading coils, and other aspects. In addition, faults may be present along the telephone lines such as: a short circuit, an open circuit, conductor leakage, a short circuit to a power line, or induction interference from a power line. The operation and communications integrity of loop transmission systems depends on the telephone line characteristics. Loop transmission systems include a plain old telephone system (POTS), and digital subscriber line services such as an integrated services digital network (ISDN), high speed digital subscriber line (HDSL), very high speed digital subscriber line (VDSL), or asymmetric digital subscriber line (ADSL). These digital subscriber line services are commonly referred to as XDSL services.

Because the integrity of XDSL communications services depend on the quality of the transmission line connection, it is desirable to test the telephone line connecting a customer premises to the PSTN to determine whether the telephone line will support the desired transmission service. It is also desirable to test the line to diagnose the source of transmission faults or interference.

Presently, two methods are commonly employed to test telephone transmission lines: (1) central office or remote terminal automated line test systems, and (2) a dispatched technician with a hand-held test set. In the first case, a line test command is sent from a centralized loop maintenance system to a network terminating node (NTN) such as a local telephone switch or carrier system located in a central office or remote equipment site. In response, the NTN connects the line to be tested through a series of relays to a system that performs electrical measurements of the telephone transmission line. The results of these measurements are then reported back to the loop maintenance system.

In the second case, a technician is dispatched to connect a hand-held test set to the telephone transmission line to be tested at one of the following locations: (1) the central office main distributing frame, (2) the network interface device (NID) at the customer node, or (3) an intermediate point such as a serving area interface point. Using the hand-held test set, the technician measures the electrical characteristics of the line and reports the results of the test to the loop maintenance center. In either case, the electrical characteristics of the line are known, and a determination can then be made as to the type of digital communications services the telephone transmission line will support.

There are several shortcomings, however, with the present methods for qualifying telephone transmission lines for digital communication services. In the first case, transmission loops served from some network terminating nodes, such as digital subscriber line access multiplexers and digital loop carrier systems, may not provide metallic test access to the telephone transmission line or the line measurement unit. In the case where telephone service is not yet activated, the telephone transmission line may not be connected to an NTN at all. In these situations, it would not be possible to perform an automated line test from the network-end of the line. Furthermore, transmission loops which are connected to an NTN with a metallic test bus and a line measurement unit, may only respond to test frequencies within the sub-4 kHz band due to bandwidth limitations of the test bus or the line measurement unit. In addition, background interference noise at the customer node may be difficult to observe with testing equipment located only at the NTN.

Dispatching a technician to test the telephone transmission line has the obvious shortcoming of increasing the time and expense to provide digital communication services to customers. This results from the need for personnel to perform these tests, and the need to provide technicians with testing equipment.

The present invention overcomes the shortcomings of present telephone transmission line testing methods by providing a modem at the customer premises for testing and qualifying the customer connection to the PSTN for XDSL communication services.

FIG. 1 is a schematic block diagram of one embodiment of the present invention used in connection with a computer located at a customer premises.

FIG. 2 is a schematic block diagram of one embodiment of the modem for use in the telephone line testing scenario of FIG. 1.

FIG. 3 is a perspective view of one embodiment of a direct access arrangement testing device according to the present invention.

Computer 18 is shown as part of a representative digital communications system at a customer premises 12. The modem 10 is typically a necessary part of computer 18 which allows computer 18 to transmit and receive digital signals over telephone transmission line 24. For purposes of line testing, however, computer 18 is not necessary if modem 10 is equipped with a user interface for displaying the results of the telephone transmission line test. It is to be understood that computer 18 is shown for illustration purposes and could be interchanged, for example, with other equipment that generates a communications signal to be sent over the telephone transmission line 24.

Figure 1:
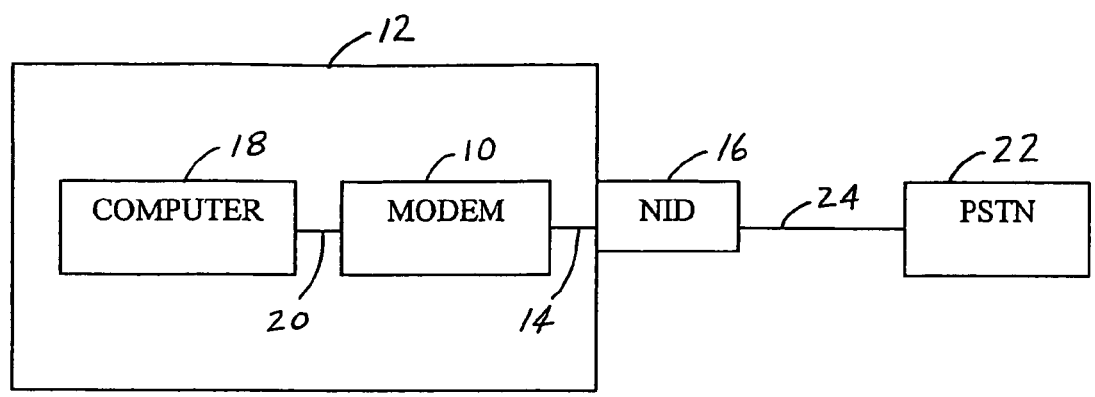
Referring to FIG. 1, there is shown a schematic block diagram of an embodiment of the present method of testing a telephone transmission line. The system shown in FIG. 1 comprises a modem 10 located at the customer premises 12 which is connected by way of transmission line 14 to the network interface device 16 at the customer premises 12. Transmission line 14 will typically comprise the modem line connected to a common telephone wall jack, and associated wiring from the wall jack to the network interface device 16. Alternatively, transmission line 14 can comprise the modem line connected directly into the network interface jack in the NID 16. It is contemplated that the modem 10 will typically be part of a digital communications device such as a computer 18 or will be connected to such a device as shown in FIG. 1 by transmission line 20. XDSL modems are commonly included in today's personal computer systems. Unlike customer-end XDSL modems to date, however, modem 10 includes wideband loop testing and reporting functions. Between the network interface device 16 at the customer premises 12 and the public switch telephone network (PSTN) 22, is the telephone transmission line 24 to be tested. Of course, the PSTN could also represent a digital network.
Figure 2:
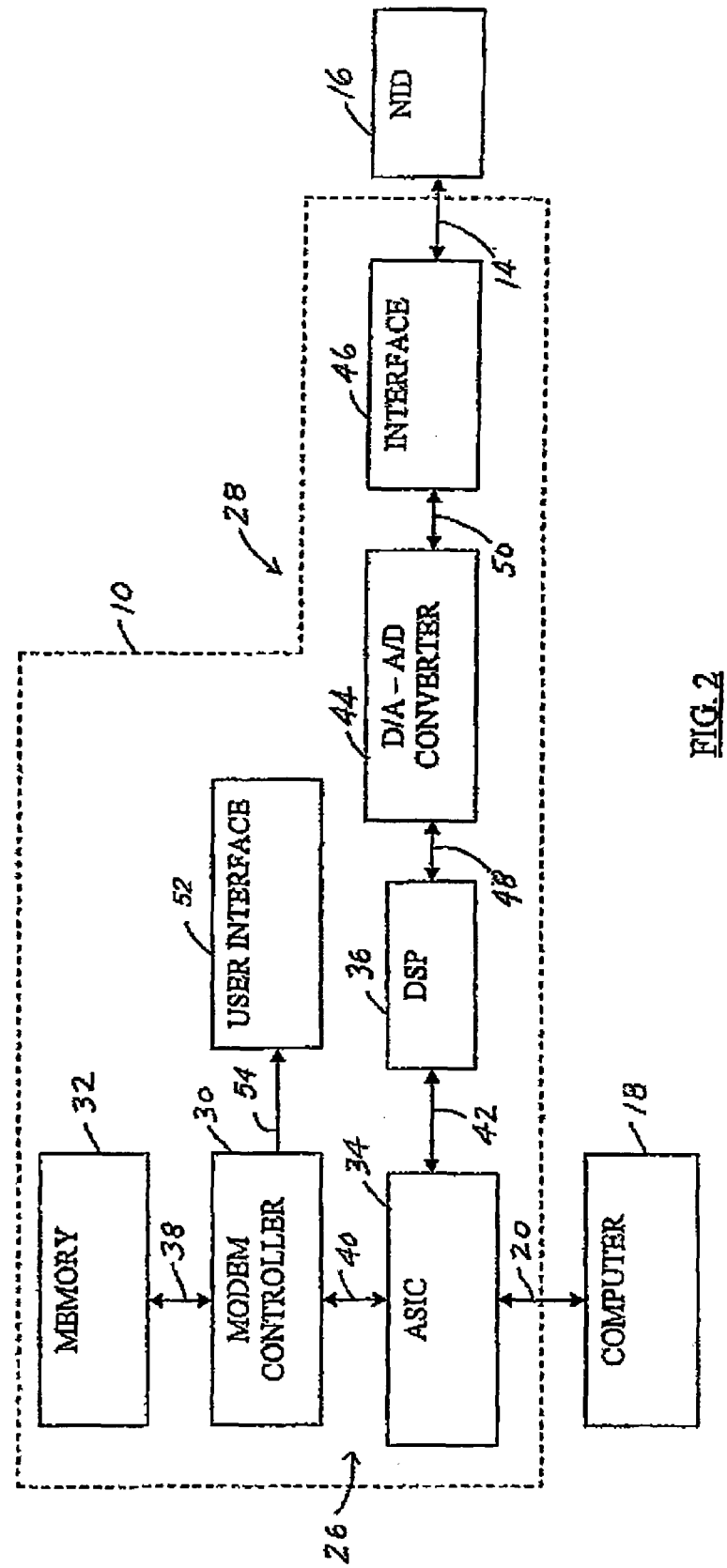

Referring to FIG. 2, an embodiment of the modem 10 comprises a transmitter/receiver 26 and direct access arrangement (DAA) 28. The transmitter/receiver 26 includes a modem controller 30 such as a microprocessor, associated memory 32, application specific integrated circuit (ASIC) 34, and a digital signal processor (DSP) 36. These components communicate along signal paths 38, 40 and 42.

The direct access arrangement 28 includes a digital-to-analog (D/A) and analog-to-digital (A/D) converter 44 and telephone interface circuitry 46. The converter 44 communicates with the DSP 36 and interface 46 along signal paths 48 and 50, respectively. The interface 46 transmits signals to and receives signals from the network interface device 16 along transmission line 14.

The modem controller 30, memory 32, ASIC 34, and DSP 36 define a transmitter for generating test signals on telephone transmission line 24. Modem controller 30, memory 32, ASIC 34 and DSP 36 also define a receiver for detecting signals in response to test signals transmitted to telephone transmission line 24.

The connection and operation of the components thus far described in modem 10 are well known.

In addition, modem 10 preferably includes a user interface 52 in communication with modem controller 30 along signal line 54 for displaying the telephone transmission line test results to a user.

In operation, customers who desire DSL services would connect the modem 10 to a wall jack at the customer premises or the network interface jack in the network interface device 16. The modem 10 performs a series of telephone line tests to qualify the line for its desired use and/or to diagnose the source of transmission interference. The test results are presented to the user by the user interface 52 or, alternatively, can be transmitted to, for example, computer 18 for display, or along transmission line 24 to a communications service provider. In this manner, the telephone transmission line 24 can be pre-qualified for the desired communications service.

To display an output indicative of the electrical characteristics of telephone transmission line 24, the modem 10 performs a series of tests. The testing sequence and logic is stored in memory 32 and executed by memory controller 30 in cooperation with transmitter/receiver 26 and DAA 28. The following functions are carried out by the modem 10 in qualifying the telephone transmission line 24. One function is line monitoring which consists of measuring background noise power in one or more frequency bands in a frequency range of approximately 0 Hz to 5 MHz. Another function is measurement of AC or DC voltage between the tip and ring, tip and ground, and ring and ground terminals of the telephone transmission line 24. Stimulus and response testing is also performed by the modem 10 in the form of transmitting test tones, receiving response signals in response to the test tones, and analyzing the amplitude and phase of the signal reflections from the transmission line 24. Additionally, modem 10 transmits test pulses, receives response signals in response to the test pulses, and analyzes the amplitude and delay of the pulse reflections from the transmission line 24. Additional functionality includes measurement of resistance between the tip and ring, tip and ground, and ring and ground terminals of transmission line 24, as well as measurement of the capacitance between the tip and ring terminals of transmission line 24.

Depending upon the communication service desired by the customer, a series of measurements could be performed with some of the tests performed more than once, or not at all, depending on the system configuration or the results of earlier tests. In addition, or alternatively, during a test sequence, the end-user could be instructed by the modem controller 30 via the user interface 48 to perform certain actions such as to place telephones on or off hook.

At the conclusion of the sequencing and analysis, a transmission line quality value is developed as a function of the test results.

One scenario for deriving the line quality value is as follows. The user is asked to indicate the type of DSL transmission system for which the line analysis is being performed. For example: HDSL, ADSL, or ISDN. From this, assumptions are made for the typical transmitted frequency band(s), signal power, modulation method, and coding, among other things.

The broadband attenuation of the line is estimated by applying a voltage step to the line 24 and measuring the time-constant of the resulting current flow. The time-constant estimates the line capacitance, from which the line length is inferred. The estimation of the broadband attenuation could further be refined by applying a short voltage pulse to the line and measuring the number and amplitude of the observed echoed pulses. From these pulses, the presence of bridged taps can be ascertained. An additional attenuation allowance would then be made for each bridged tap. By applying a single or multiple tone frequency sweep to the line and observing the reflected signals, nonlinear distortion and the presence of a loading coil can also be detected. In addition, the background line noise would be preferably measured in one or more frequency bands. If the line response indicates the presence of a loading coil, then the line is not suitable for broadband DSL service. This would be indicated to the user or service-provider.

With knowledge of the nominal transmitted signal power and the estimated line attenuation from the measurements mentioned above, the received signal power is predicted. The noise power is predicted from the measured background noise, and the measured nonlinear distortion. A predicted signal-to-noise ratio (SNR) value is then estimated. For a known transmission method (modulation type, transmit power, coding type, bandwidth) the achievable bit-rate is derived from the SNR. For asymmetric transmission systems (such as ADSL), a SNR estimate is derived separately for the upstream and downstream directions. Thus, a separate bit-rate capacity estimate is provided for each direction of transmission.

This bit-rate capacity is then represented as a line quality value which is then displayed to the end user by way of the user interface 48. The customer could then relay the line test results to the communications service provider. Alternatively, the test results could be transmitted to the service provider over transmission line 24.

With the preferred implementation of the line testing method, line testing would be performed in a single-ended manner. In other words, the test is conducted at the customer premises only, and no testing equipment is required at the other end of telephone transmission line 24. Of course, as an alternative implementation, a double-ended test could be performed involving coordinating testing functions at both the customer end of telephone transmission line 24 and the network end of telephone transmission line 24. In the double-ended testing scenario, test signals can be transmitted and received by the modem 10 and the PSTN 22.

The testing procedures described above can be initiated by either the end user at the customer premises or by way of an initiation message from the service provider or the local network provider via the DSL path or dial-up voice band modem connection.

Figure 3:
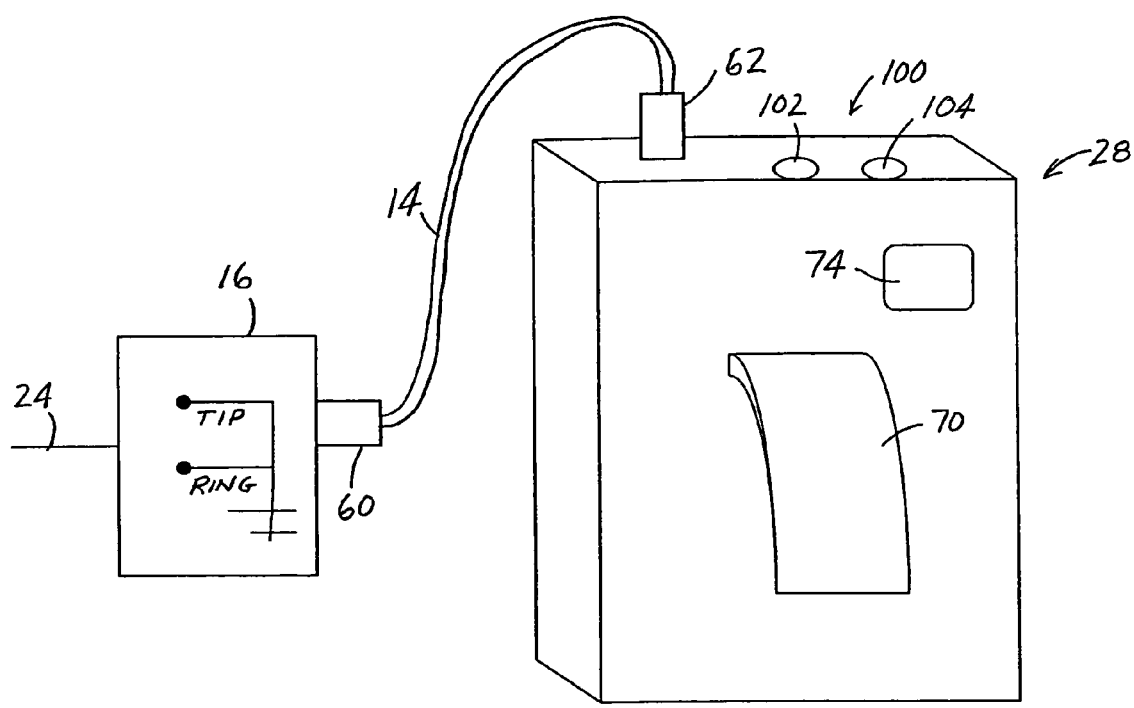

Referring now to FIG. 3, there is shown a perspective view of one embodiment of a direct access arrangement device 28 according to the present invention. The device is a hand-held test set, connected by way of a transmission line 14 to a network interface device (NID) 16 at the customer premises. In the example shown in FIG. 3, the transmission line is a standard telephone line with RJ-11 connectors 60, 62 for connecting to the NID 16 and PSTN by way of the telephone transmission line 24. If the device is being used at the network central office, a different type of communication cable may be used to interface with the main distribution frame (MDF) or switch location associated with a particular customer's loop.

The test set is small in size and can be hand-held. For example, the set may be 7.times.4.times.2 inches or less. For easy portability, a belt-clip 70 can be affixed to one side of the device. Preferably, the device is battery powered, and activated with a power switch 74 after connection. The user interface 100 includes two indicators such as LEDs 102, 104 which preferably can each indicate red or green and can flash on and off or be lit continuously.

In operation, the test set qualifies a customer loop for XDSL communications, the loop being from between the ADSL termination unit-remote (ATU-R) to the ATU-Central Office (ATU-C). Once connected, the test set performs at least several of the line tests discussed above, including attempting to synchronize as an ADSL modem. The test set is capable of inter-operating with the Alcatel 1000 and/or Cisco 6100 digital subscriber loop access multiplexers (DSLAMs), for example.

Upon power-up, LED 104 indicates that initialization is complete and power is sufficient (solid green light), power is low (flashing green light), or that the set has failed its power-up initialization tests (solid or flashing red light). If power-up is successful, the test set continues into the testing phase. At least several of the tests outlined above are performed including testing for an open circuit on either the tip or ring terminal. That is, tip to ground, ring to ground and tip to ring voltages are determined. During the testing phase, while the unit is performing the tests, LED 102 is blinking green to indicate that the unit is active. If all of the tests are successful and the unit has determined that the customer loop qualifies for XDSL communications, LED 102 is activated to be solid green. If the tests have failed, the indicator is activated as a solid or flashing red light. However, if the open circuit test has failed, i.e., there is insufficient voltage detected between the tip and ring circuits, the indicator alternates flashing green and red. The alternating green/red signal thus indicates a possible open loop on the customer circuit. If the open loop issue is resolved, the customer loop may still qualify for XDSL communications services. In this way, the test unit acts as a go/no-go gauge for qualifying a customer loop either at the customer premises, or at the central office. When performed at the customer premises, the unit may communicate either the test passed, test failed, or test failed with possible open loop results to the central office.

The hand-held test set of FIG. 3 thus provides a simple, effective device for qualifying a customer loop for XDSL communication services. Of course, the user interface could take many forms, and others are contemplated by the present invention. Preferably, however, the interface should communicate at least whether the test has passed or failed and whether a possible open circuit condition exists. One indication could accomplish this by a solid, slow blinking and fast blinking signal, respectively, for example. The test set of FIG. 3 qualifies the customer loop by indicating whether the customer modem will be able to synchronize with the network. It does not test for optimum communications rates.

While the invention has been described in connection with one or more embodiments, it is to be understood that the invention is not limited to these embodiments. On the contrary, the invention covers all alternatives, modifications and equivalents as may be included within the scope and spirit of the appended claims.

What is claimed is:

1. A method comprising:
    applying a test sequence to a transmission line with a modem to determine an estimated line attenuation;
    predicting, using the modem, a noise power level from measured background noise of the transmission line;
    estimating a signal-to-noise ratio value from the predicted noise power level and from a predicted received signal power;
    deriving an achievable bit-rate estimate from the estimated signal-to-noise ratio value; and
    generating an output to a display indicative of a service qualification based on the achievable bit-rate estimate.

2. The method of claim 1, wherein applying the test sequence comprises:
    applying a short voltage pulse to the transmission line; and
    measuring a number of echoed pulses and an amplitude of each of the number of echoed pulses.

3. The method of claim 2, further comprising:
    determining that one or more bridge taps are present; and
    adding an attenuation allowance for each of the one or more bridge taps to the estimated line attenuation.

4. The method of claim 1, wherein applying the test sequence comprises:
    applying a frequency sweep to the transmission line;
    monitoring reflected signals of the transmission line for non-linear distortion; and
    generating an output signal indicating that the transmission line is not suitable for broadband digital subscriber line service if the reflected signals contain a distortion indicative of a loading coil.

5. The method of claim 4, wherein the frequency sweep comprises a multiple tone frequency sweep.

6. A system comprising:
    a modem comprising:
        a transmission line interface to a transmission line;
        a memory to store a plurality of transmission line tests, wherein one of the transmission line tests is configured to generate an output to a display indicative of a service qualification based on an achievable bit-rate estimate, wherein the achievable bit-rate estimate is derived from an estimated signal-to-noise ratio value, wherein the estimated signal-to-noise ratio value is obtained from a predicted noise power level and from a predicted received signal power, and wherein the predicted noise power level is obtained by the modem from measuring background noise of the transmission line; and a controller coupled to the memory and to the transmission line interface, the controller to select one or more tests of the plurality of transmission line tests from the memory, the controller to perform the selected one or more tests on the transmission line and to detect an electrical characteristic of the transmission line.

7. The system of claim 6, further comprising:
a display coupled the controller, the display operable to display an output indicative of the detected electrical characteristic.

8. The system of claim 6, wherein at least one of the transmission line tests is also configured for applying a test sequence to the transmission line with the modem to determine an estimated line attenuation.

9. The system of claim 6, further comprising:
a device interface; and
a computer including a processor coupled to the device interface, the computer to transmit data to and receive data from the transmission line via the modem.

10. The system of claim 6, further comprising:
a computer coupled to the modem, the computer to provide a user interface to interact with the modem to test the transmission line.

11. The system of claim 6, wherein the selected one or more transmission line tests comprise a background noise power test to measure background noise power of the transmission line in one or more frequency bands.

12. The system of claim 6, wherein the selected one or more transmission line tests comprise a voltage test to measure a voltage potential between a tip and a ring, the tip and a ground terminal, or the ring and ground.

13. The system of claim 6, wherein at least one of the selected one or more transmission line tests comprise a stimulus and response test wherein the controller transmits test tones onto the transmission line, receives a reflected signal from the transmission line, and analyzes an amplitude and a phase of the reflected signal to determine the electrical characteristic.

14. A computer-readable medium having computer-readable instructions to direct a modem to test a transmission line the computer-readable instructions executable by a processor to select a test sequence from a plurality often sequences in a memory of a modem based on a desired communication service, to perform the test sequence on the transmission line using the modem to determine an electrical characteristic of the transmission line, and to generate within the modem an output value indicative of the electrical characteristic, wherein one of the test sequences includes predicting using the modem a noise power level from measured background noise of the transmission line, estimating a signal-to-noise ratio value from the predicted noise power level and from a predicted received signal power, deriving an achievable bit-rate estimate from the estimated signal-to-noise ratio value, and generating an output to a display indicative of a service qualification based on the achievable bit-rate estimate.

15. The computer-readable medium of claim 14, wherein the test sequence is applied to the transmission line to determine an estimated line attenuation.

16. The computer-readable medium of claim 15, wherein the test sequence comprises:
applying a short voltage pulse to the transmission line; and
measuring a number of echoed pulses and an amplitude of each of the echoed pulses.

17. The computer-readable medium of claim 14, wherein selection of the test sequence comprises:
receiving a user instruction via a user interface of the modem; and
automatically selecting the test sequence from the plurality of test sequences in response to the user instruction.

18. The computer-readable medium of claim 14, wherein selection of the test sequence comprises:
executing a first test operation of the selected test sequence;
monitoring the transmission line to determine a result in response to the first test operation; and
executing a second test operation in response to the result of the first test operation.

19. The computer-readable medium of claim 14, wherein performance of the test sequence comprises:
measuring background noise power of the transmission line in one or more frequency bands.

20. The computer-readable medium of claim 14, wherein the test sequence comprises:
transmitting one or more stimulus signals to the transmission line;
receiving at least one reflected signal in response to the one or more stimulus signals; and measuring a characteristic of the at least one reflected signal.

21. The computer-readable medium of claim 20, wherein the characteristic of the at least one reflected signal is selected from a group consisting of an amplitude, a phase, a delay, and a time constant.

* * * * *